United States Patent
Ruuska (10) Patent No.: US 6,584,330 B1
(45) Date of Patent: Jun. 24, 2003

(54) ADAPTIVE POWER MANAGEMENT FOR A NODE OF A CELLULAR TELECOMMUNICATIONS NETWORK

(75) Inventor: Tauno Ruuska, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 367 days.

(21) Appl. No.: 09/618,894

(22) Filed: Jul. 18, 2000

(51) Int. Cl.⁷ .................................................. H04B 1/38
(52) U.S. Cl. ........................ 455/574; 455/343; 455/423; 455/561
(58) Field of Search ................................. 455/343, 561, 455/574, 423, 417, 524

(56) References Cited

U.S. PATENT DOCUMENTS

| 4,794,649 | A |   | 12/1988 | Fujiwara |
| 5,034,993 | A | * | 7/1991  | Sasuta et al. ................ 455/11 |
| 5,548,813 | A |   | 8/1996  | Charas et al. |
| 5,590,395 | A | * | 12/1996 | Diekelman ................ 455/13.1 |
| 5,648,962 | A | * | 7/1997  | Pirinen ........................ 370/338 |
| 5,689,815 | A |   | 11/1997 | Yamazaki et al. |
| 5,771,017 | A |   | 6/1998  | Dean et al. |
| 5,822,693 | A |   | 10/1998 | Harrison |
| 5,854,971 | A |   | 12/1998 | Nagoya et al. |
| 5,862,459 | A |   | 1/1999  | Charas |
| 5,884,187 | A |   | 3/1999  | Ziv et al. |
| 5,924,040 | A |   | 7/1999  | Trompower |
| 5,933,766 | A |   | 8/1999  | Dent |
| 5,991,629 | A | * | 11/1999 | Agrawal et al. ............. 455/446 |
| 6,073,035 | A | * | 6/2000  | Witter ......................... 455/574 |
| 6,339,694 | B1 | * | 1/2002 | Komara et al. ............. 455/11.1 |
| 6,347,226 | B1 | * | 2/2002 | Virtanen ..................... 455/450 |
| 6,356,531 | B1 | * | 3/2002 | Soliman ..................... 370/241 |
| 6,360,106 | B1 | * | 3/2002 | Besson ........................ 455/561 |
| 6,463,050 | B1 | * | 10/2002 | Nagashima ................. 370/347 |

\* cited by examiner

Primary Examiner—Thanh Cong Le
Assistant Examiner—James D Ewart
(74) Attorney, Agent, or Firm—Nixon & Vanderhye P.C.

(57) ABSTRACT

Equipment and/or functions at a node (e.g., base station) of a cellular telecommunications network are turned off or put into sleep mode during periods of low traffic in order to reduce power consumption by the node. The equipment and/or functions are then turned back on again during periods of high traffic load in order to provide the required service to users. Exemplary actions which can be taken in order to save power during the power saving mode include, for example and without limitation: 1) switching off or putting to sleep one or more MCPAs, 2) turning off one or more carriers, 3) turning off one or more sectors with regard to a frequency, 4) turning off or putting to sleep at least a portion or part of one or more circuit boards, and/or 5) reducing fan speed based upon traffic load of the node. Any one or more of these or similar actions may be taken in order to enable the node to save power when its traffic load is at a low level. Power consumption can thus be reduced.

19 Claims, 11 Drawing Sheets

Fig. 1(b)

RNC = RADIO NETWORK CONTROLLER
RBS = RADIO BASE STATION

OMNI-DIRECTIONAL
CONFIGURATION

Fig. 7

TRI-SECTORED
CONFIGURATION

Fig. 8

HEX - SECTORED
CONFIGURATION

ADAPTIVE POWER MANAGEMENT FOR A NODE OF A CELLULAR TELECOMMUNICATIONS NETWORK

This invention relates to a system and corresponding method for saving power in a node of a cellular telecommunications network. More particularly, this invention relates to a system and corresponding method for turning off and/or putting to sleep certain components/functions of a node in a cellular telecommunications network in order to reduce power consumption, e.g., depending upon traffic load measurements associated with that node.

BACKGROUND OF THE INVENTION

Cellular telecommunications networks are known in the art. For example, see U.S. Pat. Nos. 5,822,693; 5,771,017; 5,548,813; and 4,794,649, the disclosures of which are all hereby incorporated herein by reference.

As environmental and economic issues become more sensitive, network operators in cellular telecommunications networks are paying more attention to environmental issues. Power consumption by a node in such a network can have an effect on the environment. Power generation often requires environmental input. Thus, reduction of power consumption in nodes (e.g., base stations) of such networks is desirable.

Multi-Carrier Power Amplifiers (MCPAs) are being used more and more in base station (BS or RBS) nodes of cellular telecommunications networks. MCPAs typically consume more power than conventional Single Carrier Power Amplifiers (SCPAs). Because of the increased power consumption associated with MCPAs, the desire to reduce power consumption (i.e., save power) is likewise increasing with regard to MCPA inclusive systems/nodes. Simultaneously, the need for capacity and coverage of such networks is increasing as more and more people utilize cell phones and other types of wireless communicators, which in turn increases power demand on the overall network.

It will be apparent from the above that there exists a need in the art for a system and corresponding method for reducing power consumption in nodes (e.g., base stations) of a cellular telecommunications network.

SUMMARY OF THE INVENTION

An object of this invention is to reduce power consumption (i.e., save power) in a node of a cellular telecommunications network.

According to an exemplary embodiment, the traffic load of a node (e.g., base station node) is measured. The measured load of the node, optionally in combination with other parameters such as statistical analysis and/or thresholds, is utilized in determining whether or not the node enters a power saving mode. For example, when the node's traffic load is below a particular threshold for a given period of time, the node may enter a power saving mode by turning off certain components or functions of the node and/or instructing certain components or functions of the node to enter a sleep mode.

Exemplary actions which can be taken in order to save power during the power saving mode include, for example and without limitation: 1) switching off or putting to sleep one or more MCPAs, 2) turning off one or more carriers, 3) turning off one or more sectors with regard to a frequency, 4) turning off or putting to sleep one or more circuit boards or parts of boards, and/or 5) reducing fan speed based upon traffic load of the node. Any one or more of these or similar actions may be taken in order to enable the node to save power when its traffic load is at a low level.

Accordingly, the node of the network may realize reduced power consumption. Reduced power consumption can have an advantageous affect on the environment, as well as reduced overall costs for the network.

BRIEF DESCRIPTION OF THE DRAWINGS

The foregoing and other objects, features, and advantages will be apparent from the following description of preferred example embodiments as well as illustrated in the accompanying drawings in which reference numerals refer to like parts/components. While individual functional blocks and components are shown in many of the figures, those skilled in the art will appreciate that these functions may be performed by individual hardware circuits, by a suitably programmed digital microprocessor or general purpose computer, by an Application Specific Integrated Circuit (ASIC) and/or by one or more digital signaling processes or processors.

DETAILED DESCRIPTION OF CERTAIN EMBODIMENTS OF THIS INVENTION

In the following description, for purposes of explanation and not limitation, specific details are set forth such as particular embodiments, network architectures, signaling flows, protocols, techniques, components, etc. in order to provide an understanding of the present invention. However, it will be apparent to those skilled in the art that the present invention may be practiced in other embodiments that depart from these specific details. In certain instances, detail descriptions of well known methods, interfaces, devices, protocols, and signaling techniques are omitted so as to not obscure the description of the present invention with unnecessary detail.

The instant invention relates to a system and corresponding method for saving power at respective nodes (e.g., base stations) in a cellular telecommunications network. However, for a better understanding of the instant invention, reference is first made to the components of an exemplary overall network for purposes of context.

Figure 1A:
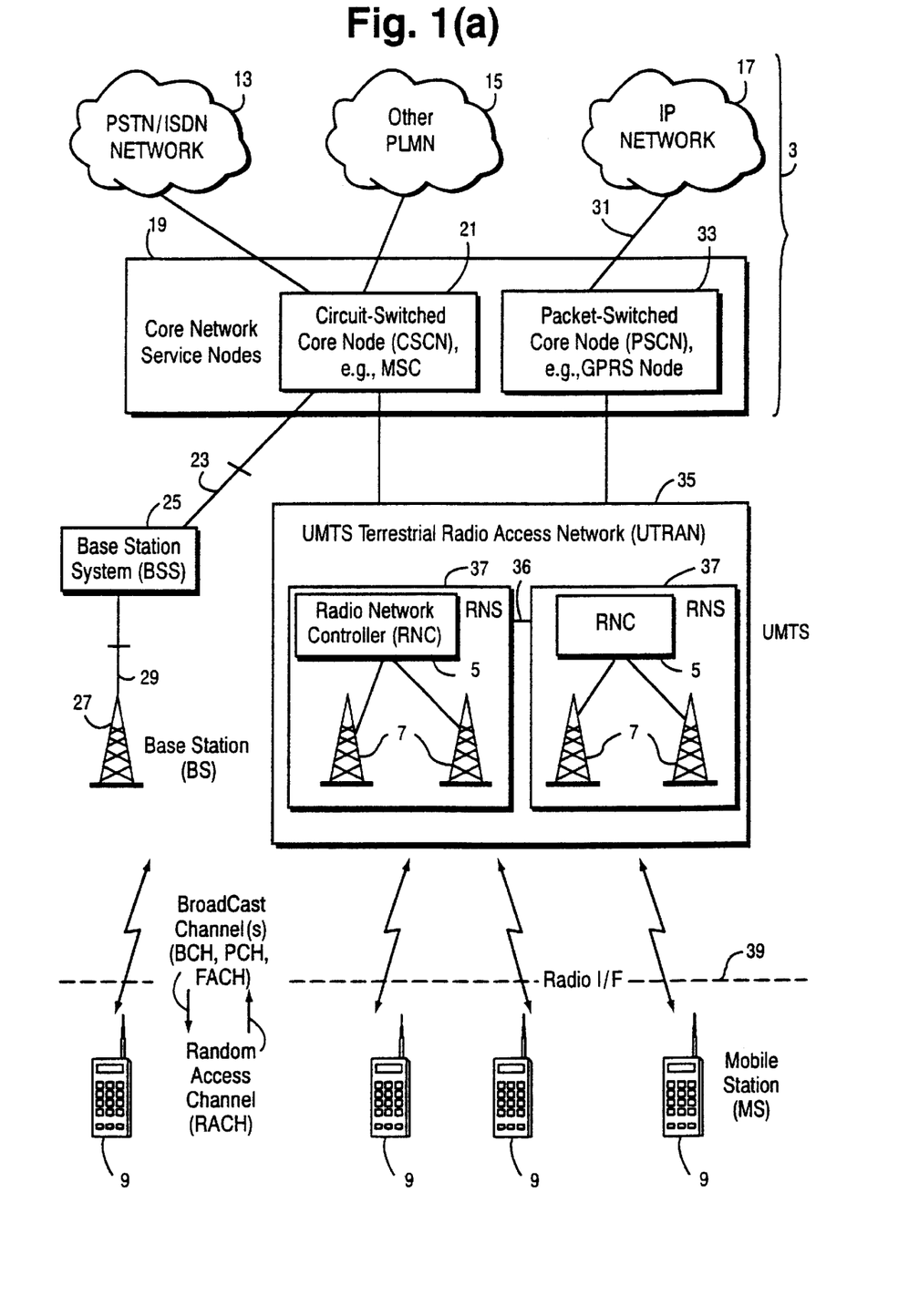
FIG. 1(a) is a block diagram of a portion of a cellular telecommunications network according to an embodiment of this invention.
Figure 1B:
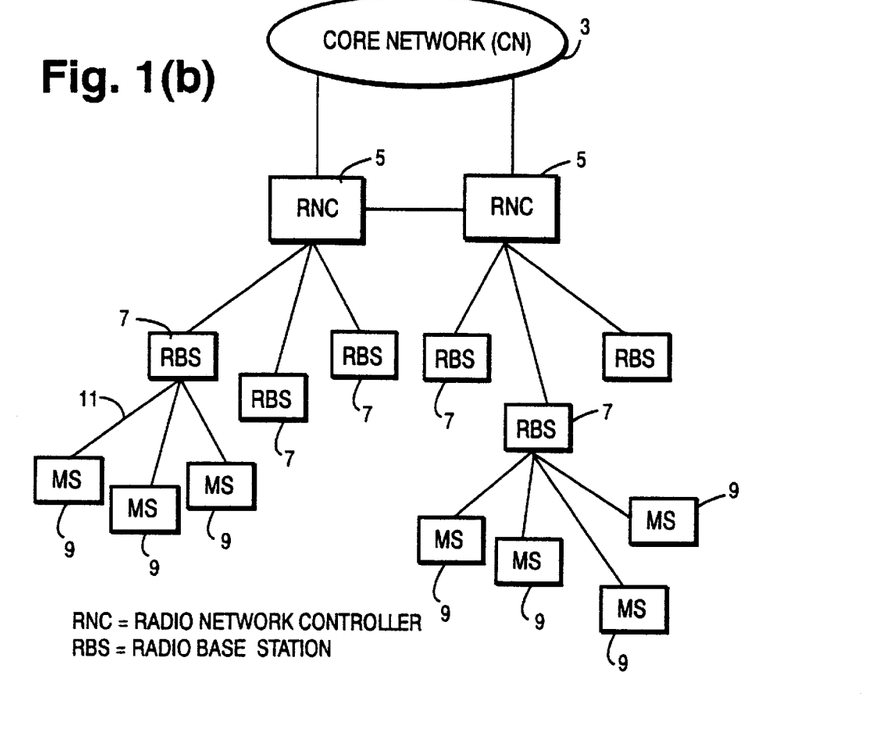
FIG. 1(b) is a block diagram of a portion of the FIG. 1 network, focusing primarily on the base station (BS or RBS) and radio network controller (RNC) nodes.

FIGS. 1(a) and 1(b) illustrate a portion of a Universal Mobile Telecommunications System (UMTS) in which the instant invention may be implemented. Among other things, the network includes core network 3, Radio Network Controllers (RNCs) 5, radio Base Stations (RBS or BS) 7, and Mobile Stations (e.g., cell phones or pagers) (MS) 9. Core network 3 may include a circuit switched external core network such as the Public Switched Telephone Network (PSTN) and/or the Integrated Services Digital Network (ISDN) 13. Another circuit switched external core network may correspond to another Public Land Mobile radio Network (PLMN) 15. A representative packet switched external core network 17 may be, for example, an IP network such as the Internet. These networks 13–17 are coupled with corresponding network service nodes 19 via any suitable communications interface. The PSTN/ISDN network 13 and other PLMN networks 15 are connected to a circuit switched core node 21, such as a Mobile Switching Center (MSC), that provides circuit switched services. The UMTS may coexist with an existing cellular network, such as the Global System for Mobile Communication (GSM) where MSC 21 is connected over an interface 23 to a base station subsystem 25 which in turn is connected to radio base stations 27 over interface 29.

Packet switched network 17 may be connected over interface 31 to a packet switched core node 33, e.g., a General Packet Radio Service (GPRS) node tailored to provide packet switched type services. Each core network service node 21, 33 also connects to the UMTS Terrestrial Radio Access Network (UTRAN) 35 over a radio access interface or any other suitable interface. UTRAN 35 includes one or more Radio Network Systems (RNS) 37 each with a Radio Network Controller (RNC) 5 coupled to a plurality of base stations (BS) 7 and to other RNCs (e.g., via 36) in the UTRAN.

Preferably, radio access over interface 39 between base stations 7 and mobile stations 9 is based upon Wideband Code Division Multiple Access (WCDMA) with individual radio channels allocated using CDMA channelization or spreading codes. WCDMA, in which multiple carrier frequencies are utilized in each base station, provides wide bandwidth and other high transmission rate demands as well as robust features such as diversity handoff to ensure high quality communication service in frequently changing environments. Each mobile station (MS) 9 may be assigned its own scrambling code in order for a base station (BS or RBS) 7 to identify transmissions from that particular MS 9.

Because of human behavior (e.g., humans tend to sleep at night and stay awake during the day), radio traffic over interface 39 between mobile station(s) 9 and corresponding base station(s) 7 does not remain constant throughout the twenty-four hours of each day. For example, traffic over interface 39 is often lower at night than during the day as many users are sleeping. Moreover, traffic may tend to increase slightly at certain times during the day when people generally are not at work (e.g., in the evening). Certainly, traffic load tends to be higher overall during the day than at night, because less users are sleeping during the day.

Figure 2:
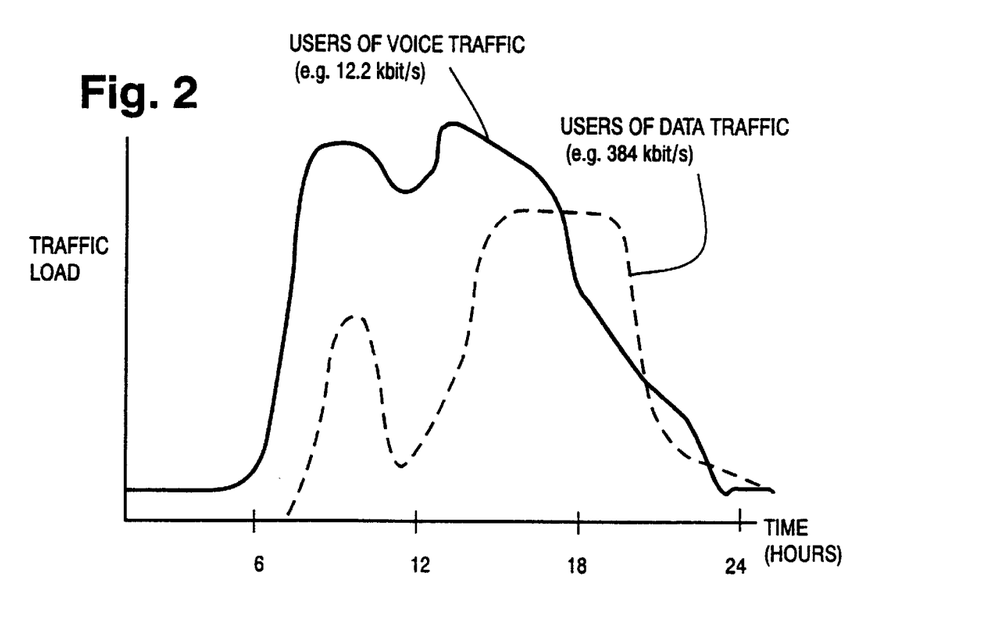
FIG. 2 is a traffic load verses time graph illustrating that traffic load at a particular base station node varies throughout the twenty-four hours of a day.

FIG. 2 is a graph illustrating that the traffic load of a particular base station 7 over interface 39 varies quite a bit throughout the course of the twenty-fours hours in a given day. As shown in FIG. 2, the traffic load is rather light during the first six hours of the day (e.g., from midnight to six o'clock a.m. in the morning), but rapidly increases to a rather high traffic volume from about seven o'clock a.m. in the morning until its starts to drop off around six o'clock p.m. at night. As the night progress, the traffic load continues to generally decrease until about the midnight hour. According to certain embodiments of this invention, such variations in traffic load at a base station node 7 may be utilized by the network in order to save power. Accordingly, certain components and/or functions may be turned off or placed into a sleep mode during light load traffic (i.e., low traffic load) conditions.

Figure 3:
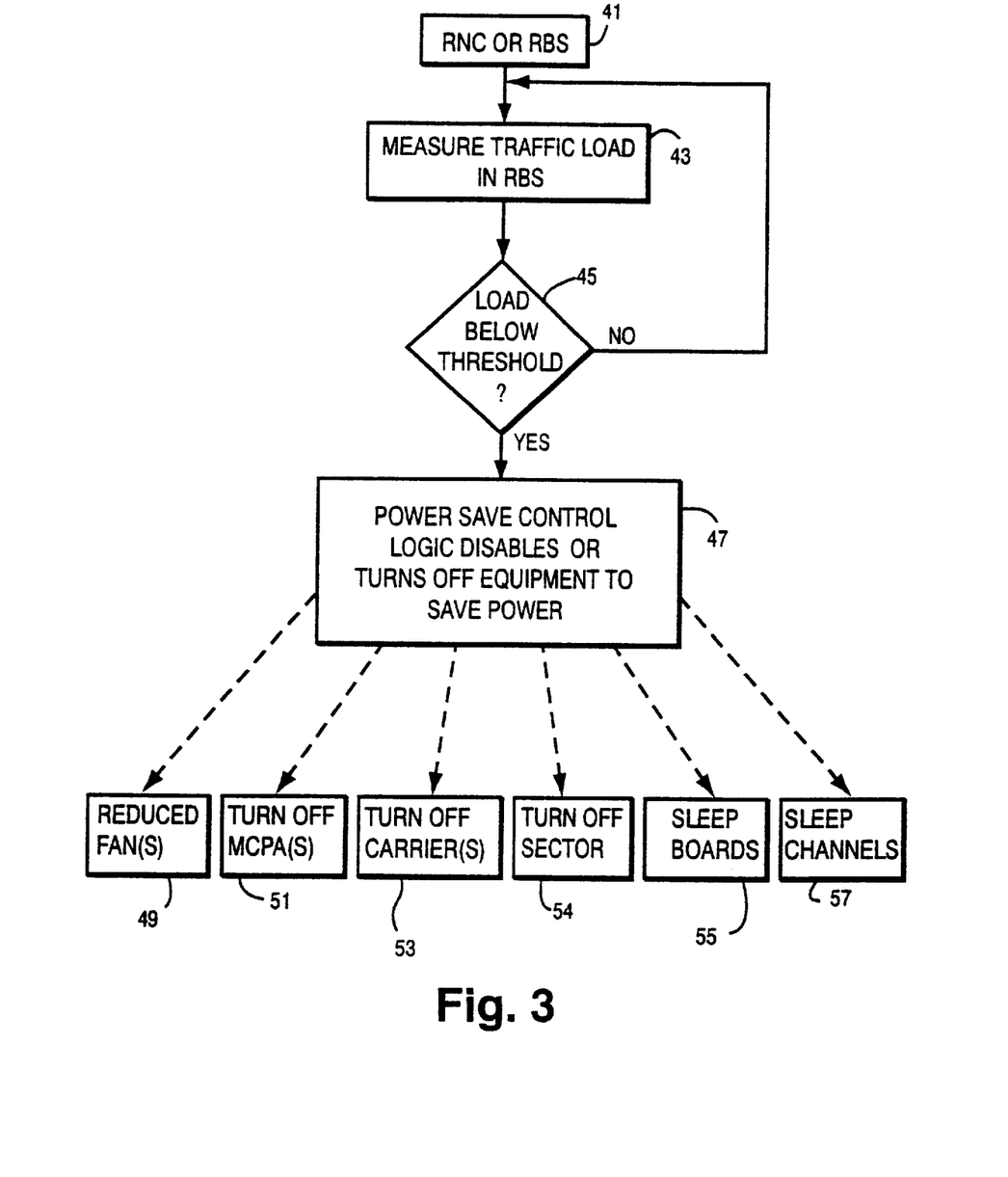
FIG. 3 is a flow chart illustrating certain steps performed in a process according to an embodiment of this invention.

FIG. 3 is a flowchart illustrating steps taken according to a method according to an embodiment of this invention. At 41, it is noted that calculations according to different embodiments of this invention may be performed at any node in the network, including but not limited to a radio network controller (RNC) node 5 or a base station (BS or RBS) node 7. At step 43, current traffic load at a particular base station is measured or otherwise determined. Again, this measurement may be performed either at the base station itself or in another suitable node of the network. At step 45, it is determined whether or not the measured traffic load is below a particular predetermined threshold. Optionally, other factors may also be taken into consideration at step 45 (e.g., whether the measured traffic load is below the threshold for a predetermined period of time, the time of day, historical trends relating to that base station, etc.).

If the inquiry at step 45 is negative, then no action is taken and the system continues to measure the traffic load for the base station 7 at issue. However, if it is determined at step 45 that the measured traffic load for the base station 7 is below the threshold (and optionally that other parameters have been met), then the process continues on to step 47 where power saving control logic is accessed. This power saving control logic may disable or turn off certain equipment and/or functions at the base station 7 in order to save power. Alternatively/additionally, this control logic may cause certain components at the base station 7 to enter into a sleep mode in order to save power. For purposes of example and without limitation, it is shown in FIG. 3 that the control logic may cause the base station to realize reduced power consumption by reducing fan power at 49, turning off one or more multi-carrier power amplifiers (MCPAs) at 51, turning off one or more carriers at 53, turning off one or more sectors at 54, causing one or more printed circuit boards (or part(s) or portion(s) of one or more boards) at the base station to go into a sleep mode at 55, and/or causing one or more channels of the base station to go into a sleep mode at 57. In order to save power, the base station may cause only one of steps 49–57 to be implemented, or alternatively may cause multiple of the steps 49–57 to be implemented (in any combination), depending upon the particular application. The equipment/functions turned off or put into sleep mode that are illustrated in FIG. 3 are for purposes of example; and those skilled in the art will recognize that any other suitable function(s)/equipment at the BS 7 may also/instead be turned off or put into sleep mode in order to save power.

Figure 4:
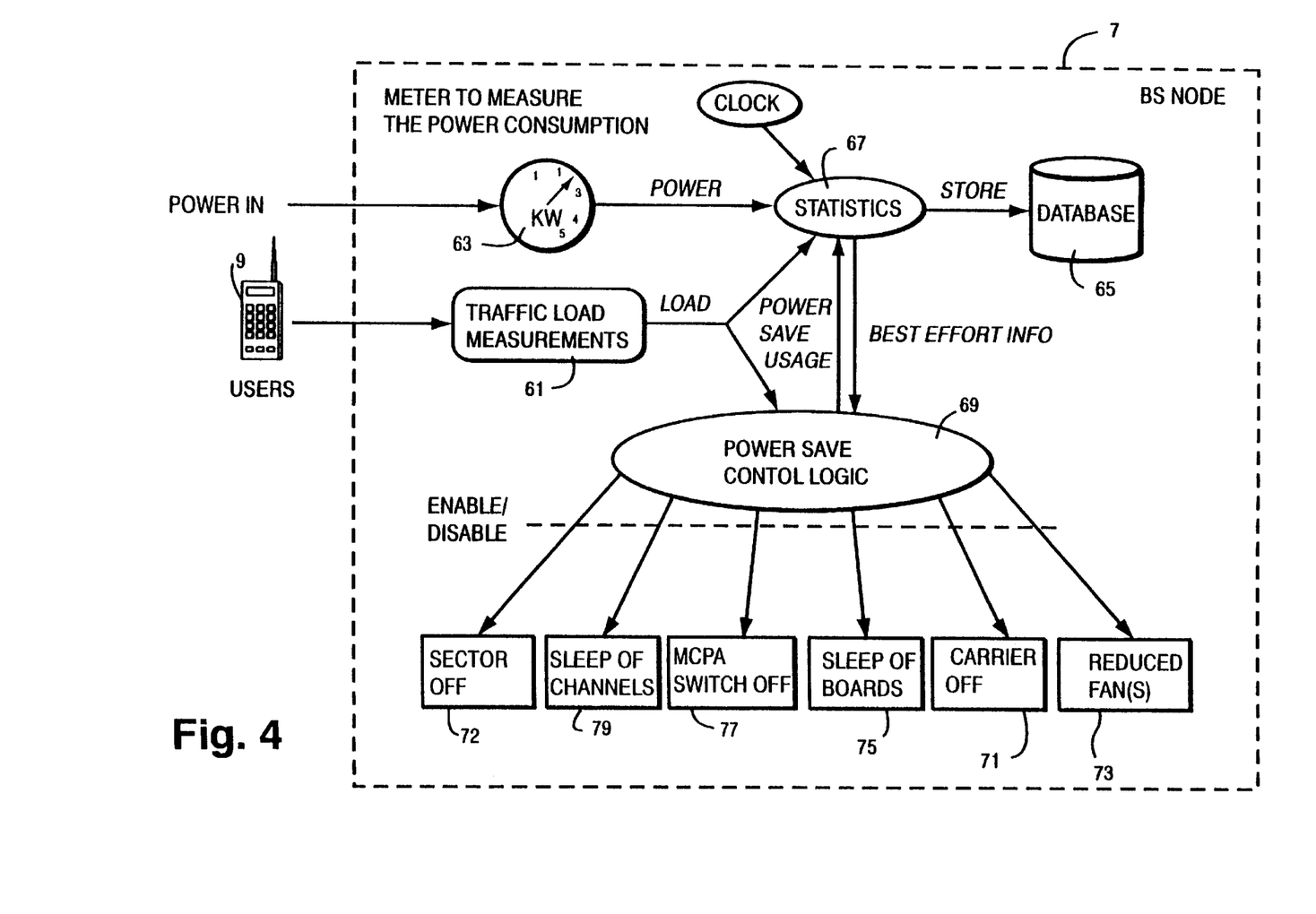
FIG. 4 is a function block diagram of certain aspects of an exemplary base station node in the network of FIGS. 1–3, according to an embodiment of this invention.

FIG. 4 is a function block diagram of a base station node 7 according to an exemplary embodiment of this invention. In this embodiment, it is noted that the traffic load measurements and statistical analysis are performed at the base station. However, it is pointed out that in other embodiments of this invention, the traffic load measurements, database storage, power save control logic, and/or statistical analysis for a base station(s) 7 may be performed at other node(s) (e.g., an RNC or some management node) of the network in communication with the base station. In either event, the adaptive power management of this invention may be utilized to automate and optimize power use by the base station.

Referring to FIG. 4, the base station (RBS or BS) 7 includes a traffic load measuring device 61, a power consumption measuring device 63 for measuring the input power consumption of the base station, database memory 65, a statistical analysis and compilation function 67, and power saving control logic (e.g., in the form of software, hardware, or the like) 69 for analyzing traffic load and/or power measurements and deciding how to best save power at the base station based upon the same. Logic 69, in order to save power, may cause one or more of the following to occur: turning off one or more carriers 71 (see step 53 in FIG. 3), reducing fan use/power 73 (see step 49 in FIG. 3), causing one or more printed circuit boards to enter a sleep mode 75 (see step 55 in FIG. 3), turning off one or more amplifiers 77 (see step 51 in FIG. 3), and/or causing one or more channels to enter a sleep mode 79 (see step 57 in FIG. 3).

Still referring to FIG. 4, input power measuring device 63 measures the power input to the base station and reports this measurement to statistical analyzer/compiler 67. Traffic load measurement device 61 measures the current traffic of the base station 7 over interface 39 by measuring one or more of the following: 1) number of users 9 currently communicating with the base station 7 over interface 39 (per time unit), 2) total current output power of the base station 7, and/or 3) user capacity (e.g., kbit/sec.) with regard to data and/or voice of the base station 7. Load measurements from device 61 are preferably input to both statistical analyzer/compiler 67 as well as power save control logic 69, as shown in FIG. 4.

Statistical analyzer/compiler 67 collects data from input power measuring device 63, traffic load measuring device 61, and power save control logic 69. The data received by statistical analyzer/compiler 67 may include, for purposes of examples and without limitation, the total base station input power consumption per time unit, the base station output power consumption per time unit, the number of users (data and/or voice) in communication with the base station over interface 39 per time unit, the used capacity (data and/or voice) of the base station per time unit, the use of different power save methods/functions 71–79 per time unit (the use of the phrase "71–79" as used herein means references numerals 71, 72, 73, 75, 77, and 79 as shown in FIG. 4), and/or power saving figures (e.g., the difference between the power consumed through utilization of power saving steps (e.g., on or more of 71–79) verses what the power consumption of the base station would have been absent such steps).

Statistical analysis performed at 67 may be utilized as an input forwarded to control logic 69 in order to reduce and/or prevent false or undesired implementations of power saving functions 71–79 (e.g., see FIG. 11 to be described in more detail hereinafter). For example, statistical analyzer/compiler 67 may function as a type of filter in order to prevent control logic 69 from implementing any of power saving functions 71–79 during what is considered to be a peak traffic load period of the day, so that a brief drop below a traffic load threshold will not trigger implementation of any power saving function 71–79. In other words, analyzer 67 may use historical data (e.g., see long term statistical curve 101 in FIG. 11) to instruct control logic 69 not to implement any of functions 71–79 between five o'clock p.m. and eight o'clock p.m. on any given day because these times typically experience high traffic loads. Thus, even a traffic load measurement below a predetermined threshold will not cause control logic 69 to implement any of functions 71–79 during this time of day, because historical data would indicate a rather high level of traffic normally during this time of day.

Analyzer/compiler 67 stores and uses data via database 65. Optionally, statistical printouts may be generated and printed from database 65. For example, the compilation aspect of statistical analyzer/compiler 67 may generate computer printouts and/or graphs illustrating the power consumption efficiency of one or more base station(s) 7 in different traffic load situations. Moreover, analyzer/compiler 67 may cause printouts and/or graphs to be generated indicative of how much power is being saved due to the selected implementation of functions 71–79 (see also steps 49–57 in FIG. 3) by control logic 69.

Power Save Control Logic (PSCL) 69 controls the use, selection, and/or implementation of power saving functions 71–79 (see also steps 49–57 in FIG. 3) within node 7. Based upon traffic load measurements (e.g., current base station output power) received from load measuring device 61 (and optionally based also upon other data received from analyzer 67 or database 65), control logic 69 selectively causes certain resources (e.g., boards, carriers, channels, amplifiers, etc.) to be switched off or alternatively put into a sleep mode in order to save power. Control logic 69, in certain embodiments of this invention, may only implement one of power saving functions 71–79. In other embodiments of this invention, control logic 69 may implement all of power saving functions 71–79 if it deems that to be necessary. In still further embodiments of this invention, control logic 69 may implement any combination of power saving functions 71–79. In still further embodiments of this invention, control logic 69 may perform a power saving optimization process in order to turn off or place into sleep mode as many resources 71–79 as possible.

In certain embodiments of this invention, control logic 69 may implement one or more of power saving functions 71–79 when it is determined that the traffic load measurement for the base station 7 at issue has gone or dipped below a predetermined threshold(s). However, in other embodiments of this invention, control logic 69 may include a protective algorithm in order to reduce false triggering of power saving functions 71–79. For example, such a protective algorithm could be used to prevent any of power saving functions 71–79 from being implemented until and unless the measured or otherwise determined traffic load has been below the threshold at issue for a predetermined period of time. In another example, such an algorithm may prevent implementation of one or more of power saving functions 71–79 during predetermined periods of the day (e.g., from six a.m. until seven p.m.). Such a protective algorithm prevents control logic 69 from causing frequent on/off switching of components (e.g., amplifiers, carriers, fans, etc.) which could be deemed as inefficient. Accordingly, an inefficient and fully automated power saving method/system may be implemented in a node of a cellular telecommunications network according to various embodiments of this invention.

As discussed above with reference to FIGS. 3 and 4, control logic 69 located at a base station 7, a radio network controller (RNC) 5, or any other node in the network, may selectively cause one or more power saving functions 71–79 to be implemented based upon measured conditions such as traffic load and the like. Implementation of power saving functions 71 (one or more carriers is turned off) and 72 (one or more sectors is turned off relative to a carrier) with regard to an exemplary embodiment of this invention is now described in more detail with reference to FIGS. 5–12. Basically, the number of active carriers in a BS 7 can here be reduced when the traffic load demand in the BS declines to a certain predetermined threshold (e.g., optionally, when it is below such a threshold for a predetermined period of time).

Figure 5:
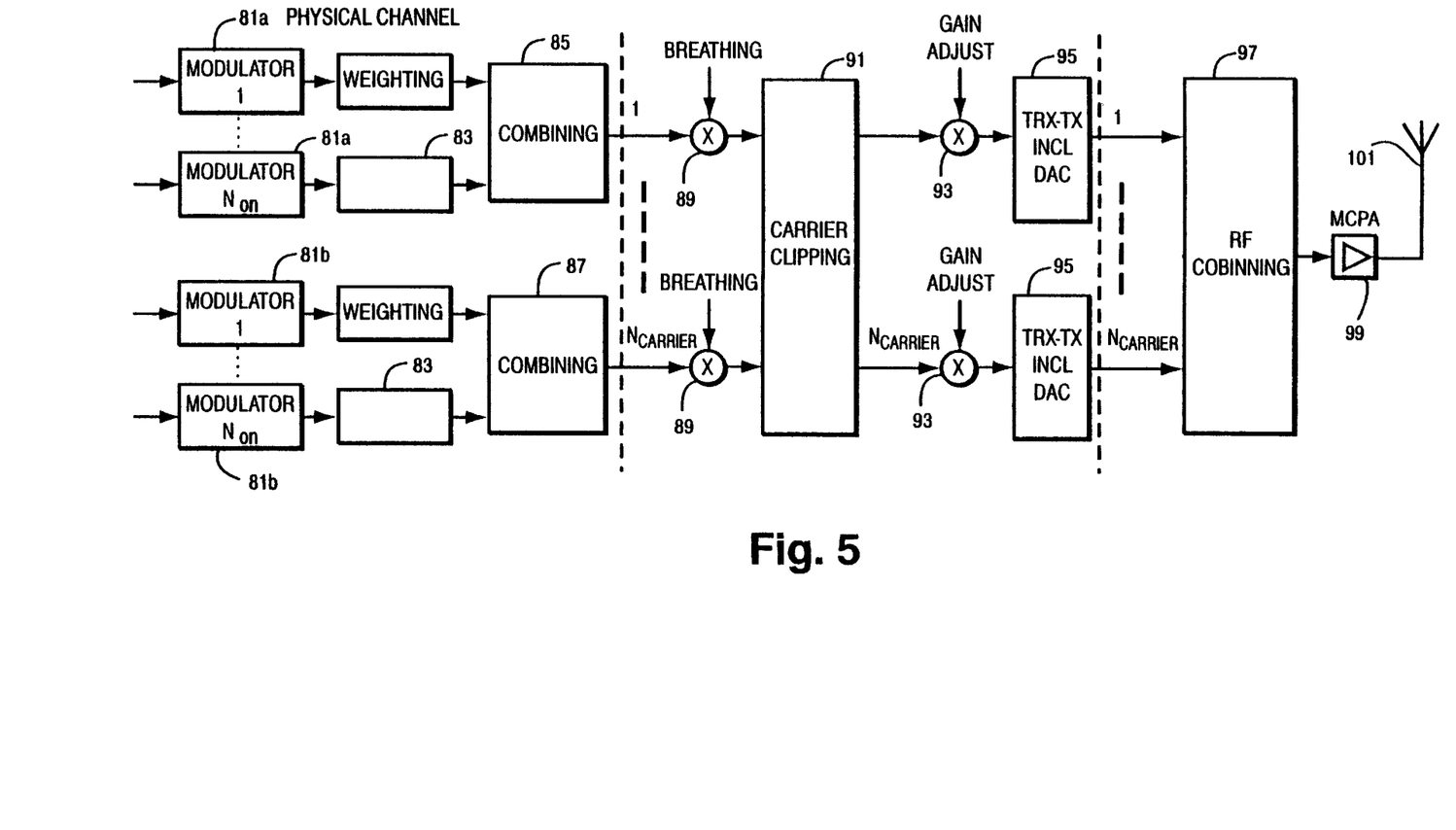
FIG. 5 is a block diagram of the transmit chain of an exemplary base station according to the FIGS. 1–4 embodiment of this invention.

FIG. 5 illustrates a portion of a signal chain of a base station 7 in which multiple carriers are utilized. The chain includes a plurality of modulators 81*a* for a first carrier frequency band, a plurality of modulators 81*b* for a second carrier frequency band, and so on. Multiple carrier frequency bands are provided (e.g., from two through eight different carriers may be used by a base station in different embodiments of this invention). For example, an exemplary BS 7 configuration may include up to e.g., four carriers in a radio access network; and each carrier plane may be divided into several sectors (e.g., three sectors per carrier plane, six sectors per carrier plane, or any other suitable number). One sector may include one or more carriers and may be controlled by its own hardware, or hardware commonly used by other sector(s). Herein, it is possible to turn off or otherwise disable at least one carrier (in a sector or in general) relative to the other carriers of the BS.

The chain of FIG. 5 further includes weighting 83 at the output of each modulator 81, combining function or summer 85 for combining or summing the different physical channels in the digital domain at the first carrier frequency, combining function or summer 87 for combining or summing the different physical channels in the digital domain at the second carrier frequency (and other summers may be provided depending upon the number of carriers of the BS 7), multipliers 89 for implementing breathing, carrier clipping circuit 91 for reducing the peak average ratio of the combined signals in the digital domain, gain adjustment multipliers 93, a digital to analog (D/A) converter 95 for each carrier, RF combining circuit 97 for combining the different carrier frequencies into a composite signal, and one or more Multi-Carrier Power Amplifiers (MCPA) 99 for amplifying the signal so that it may be broadcast by one or more antennas 101. A single MCPA 99 may be provided for the composite signal, and/or a plurality of MCPAs may be provided with one or more per carrier. A purpose of FIG. 5 is to illustrate that different carriers proceed through the transmit chain, with each carrier requiring numerous components in order to enable functionality of the same.

Figure 6:
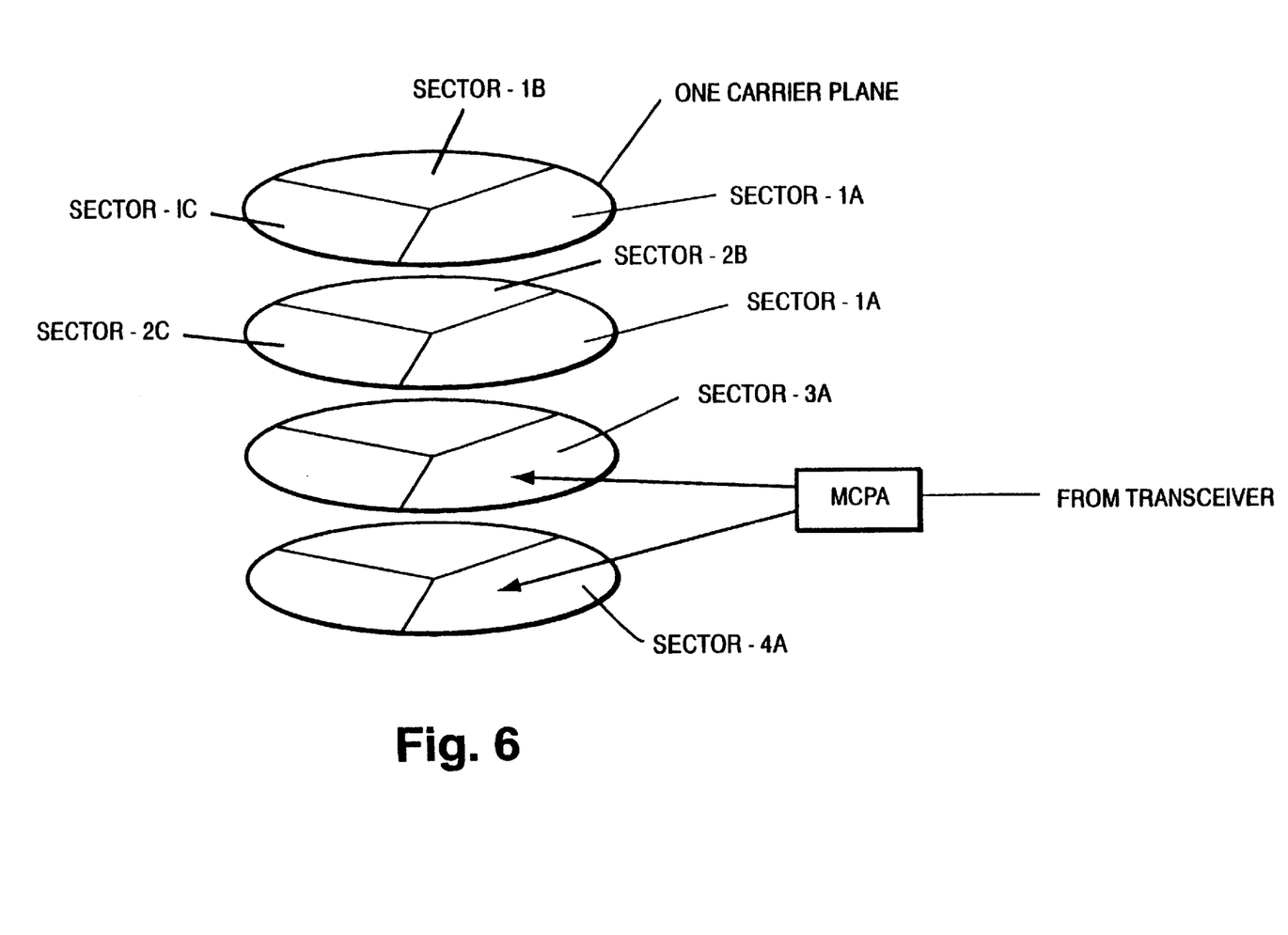
FIG. 6 is a schematic diagram illustrating that a base station may use, for example and without limitation, four different carriers and three different sectors according to an embodiment of this invention.

FIG. 6 is a schematic diagram illustrating the configuration of an exemplary base station 7 which utilizes three sectors (sectors A, B, and C) and four carriers (each carrier in FIG. 6 is defined by its own carrier plane). Thus, each carrier frequency may be utilized in multiple sectors of the cell defined by the base station 7 at issue. Moreover, a plurality of different carriers may be utilized in each sector, as shown in FIG. 6. Thus, it can be seen that each base station utilizes multiple carriers to cover each sector.

With regard to FIGS. 5–6, the number of active carriers used by a base station 7 can be reduced when the traffic load demand in the base station 7 declines below a certain predetermined threshold(s). This may occur, for example, at nighttime when many people are often resting or sleeping. Therefore, when traffic capacity demands (or traffic load) is less than a predetermined threshold(s), one or more carriers may be switched off by the base station in order to save power. By doing so, power consumption can be reduced so as to allow lower operational costs and less environmental stress. For example, if the top carrier in FIG. 6 was turned off during a low traffic load period of time (e.g., at four a.m. in the morning), the remaining three carriers could be used by the base station to cover all sectors while the turning off of the first carrier enables a reduction in power consumption. In another example, if the top two carriers in FIG. 6 were turned off by the base station, the lower two carriers could still be utilized by the base station in order to cover all three sectors during low traffic load conditions. In different embodiments of this invention, any number of carriers may be turned off at a BS 7 depending upon the load conditions at the BS, provided that there is always one carrier that is active in order to cover the BS's cell area. In other embodiments of this invention, particular sectors of one or more carriers may be turned off in order to save power (see step 54 in FIG. 3 and power saving function 72 in FIG. 4).

Figure 7:
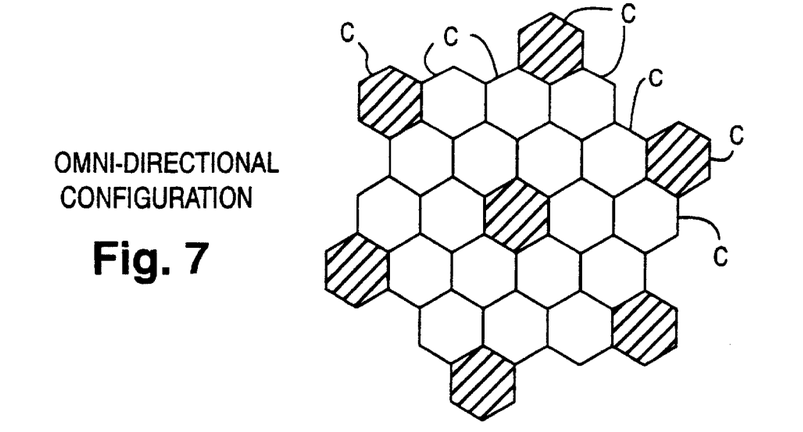
FIG. 7 illustrates a plurality of cells associated with a corresponding plurality of base stations, where the cross-hatched base stations have an omni-directional configuration (i.e., omni-directional transmit antenna(s)), according to an embodiment of this invention.
Figure 8:
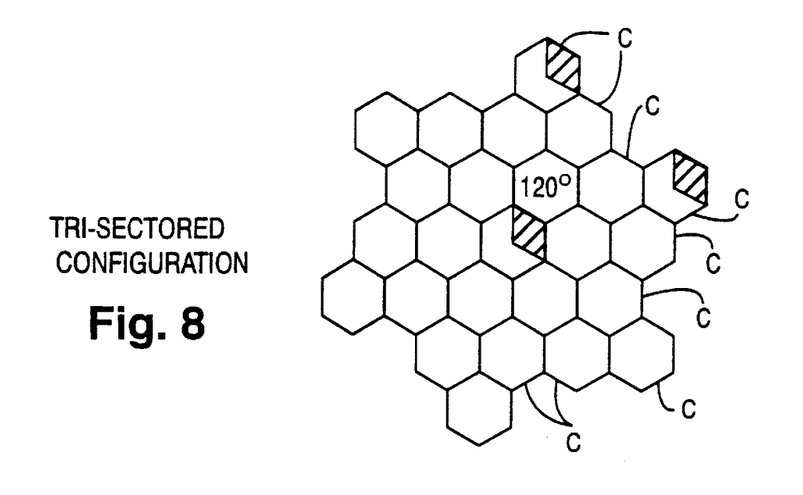
FIG. 8 illustrates a plurality of cells associated with a corresponding plurality of base stations, where the three partially cross-hatched cells correspond to respective base stations configured in a tri-sectored manner, according to an embodiment of this invention.
Figure 9:
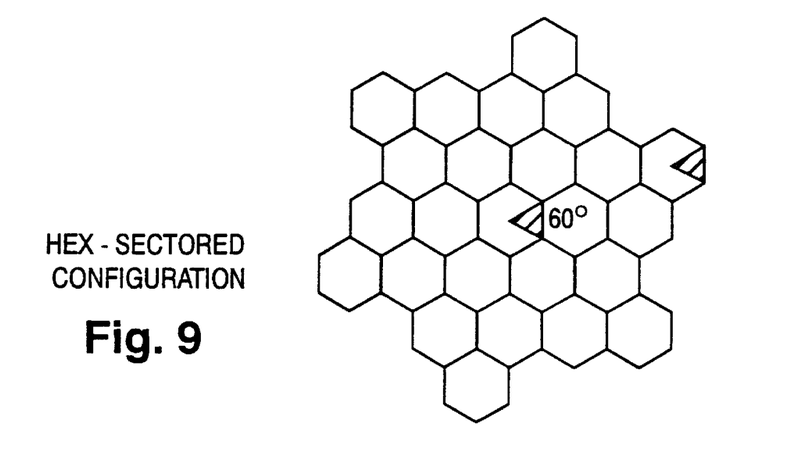
FIG. 9 illustrates a plurality of cells associated with a corresponding plurality of base stations, where the two partially cross-hatched cells correspond to respective base stations configured in a hex-sectored manner, according to an embodiment of this invention.

Reference is made to FIGS. 7–9 in order to illustrate different types of sector configurations which may utilized by a base station in different embodiments of this invention. Base stations 7 herein may be of any single or multi-sector configuration depending upon the application. In FIG. 7, a plurality of different cells C are illustrated which correspond to a corresponding plurality of different base stations 7. Each base station for at least the cross-hatched cells in FIG. 7 is configured in an omni-directional manner. In other words, the base station for each such cell includes an omni-directional antenna which broadcasts to all areas of the cell. In contrast to FIG. 7, the partially cross-hatched cells in FIG. 8 are configured in a tri-sectored manner (as in FIG. 6). Sectorization requires directional antennas. In the case of tri-sectoring, 120 degree radiation patterns are provided at the BS for such directional antennas. Each of the three tri-sectored cells in FIG. 8 has three different sectors per carrier. FIG. 9 illustrates a case where two of the partially cross-hatched cells are configured in a hex-sector manner. Preferably, when one or more sectors is turned off herein to save power, this means that at least one sector of a BS is turned off as to a particular frequency while at least one carrier remains on for that sector. Referring to FIG. 6 for example, sector 1A may be turned off for the top two carrier planes, but the carriers for the lower two carrier planes remain on in that sector.

While traffic load control functionality may be provided at a BS 7 itself as in FIG. 4, in order to turn off one or more sectors and/or one or more carriers of a BS 7 in order to save power it is often preferred that traffic load control functionality be implemented at a node above the base station 7 (e.g., in an RNC 5). This is because upper nodes such as RNC nodes 5 have more of a total image of the network wide traffic load and therefore more sophisticated control functions may be developed. Such a traffic control function may include the capability to measure the traffic load per cell carrier for each base station, determine trends of traffic load per cell carrier over time, and coordination sharing of traffic loads between carriers and/or sectors.

The node where the traffic control function is located (e.g., the RNC or BS) has the capability to measure the traffic load per a cell carrier for a base station(s) 7 at issue. Such a measurement function may include multiple static or dynamic thresholds, each threshold defining a traffic load level below which a particular carrier and/or sector is to be turned off. Traffic load per cell carrier may be measured in any suitable manner. One way in which to measure traffic load is to base the traffic capacity of the carriers on the total output power capacity of that carrier. The total output power will vary depending upon traffic intensity, used channel type, and mobile station 9 distance to the base station 7. Another way to measure load per cell carrier is to base traffic capacity of a carrier on a chosen reference traffic channel capacity (e.g., the lowest bit rate channel). This channel type could be used as a reference channel type and all other supported channel types could be normalized to this reference channel when expressing a total traffic capacity of a carrier. In any event, any suitable system/method for measuring traffic load may be used in different embodiments of this invention.

Figure 10:
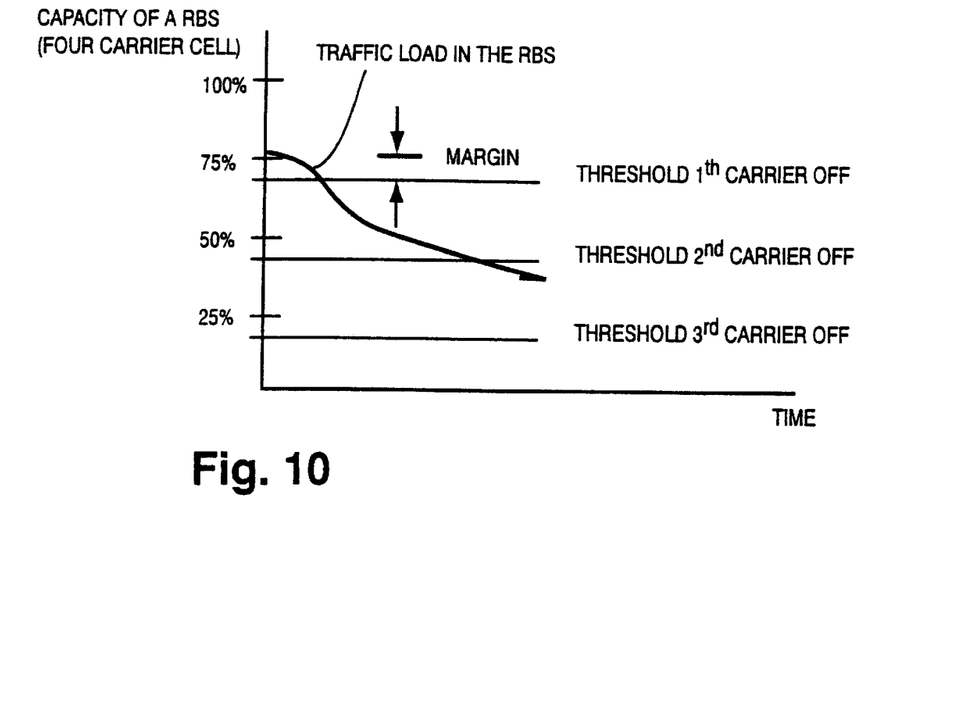
FIG. 10 is a time verses base station capacity (or traffic load) graph illustrating certain traffic load thresholds associated with a base station which cause respective carrier frequencies and/or components associated therewith to be turned off in order to save power.

FIG. 10 is a graph illustrating an exemplary traffic load of a base station 7 having four carriers. All four carriers normally share the traffic load during high traffic hours. Three different thresholds are illustrated in FIG. 10, one for each of the three carriers which may be turned off in low traffic conditions (remembering that it is preferably that at least one carrier always remain on per sector). These thresholds may be static, or alternatively may be changed/adjusted by a network operator or automatically over time as conditions change. As shown, the thresholds are at three different traffic load levels. Thus, when the traffic load goes below the first carrier threshold, the base station turns off the first carrier so that only the second, third and fourth carriers are operating. When the traffic load continues downwardly and passes below the second carrier threshold, the base station turns off the second carrier so that only the third and fourth carriers are operating. If, by chance, the traffic load were to continue decreasing further than what is shown in FIG. 10 to a level below the third carrier threshold, then the base station would cause the third carrier to be turned off so that only the fourth carrier was in operation.

Optionally, various techniques may be used in order to reduce unnecessary turning on/off of carriers. For example, according to one exemplary embodiment, a carrier is only turned off after the traffic load is below the corresponding threshold for a predetermined period of time (e.g., five minutes). In other embodiments, the use of statistical measurements and/or trend estimations may be used in order limit undesirable carrier turn-offs and/or turn-ons. Long term statistical data relating to traffic load levels of a base station may be collected in order to form a long term traffic load trend curve so as to enable the system to know when it is worthwhile to turn off a carrier.

Figure 11:
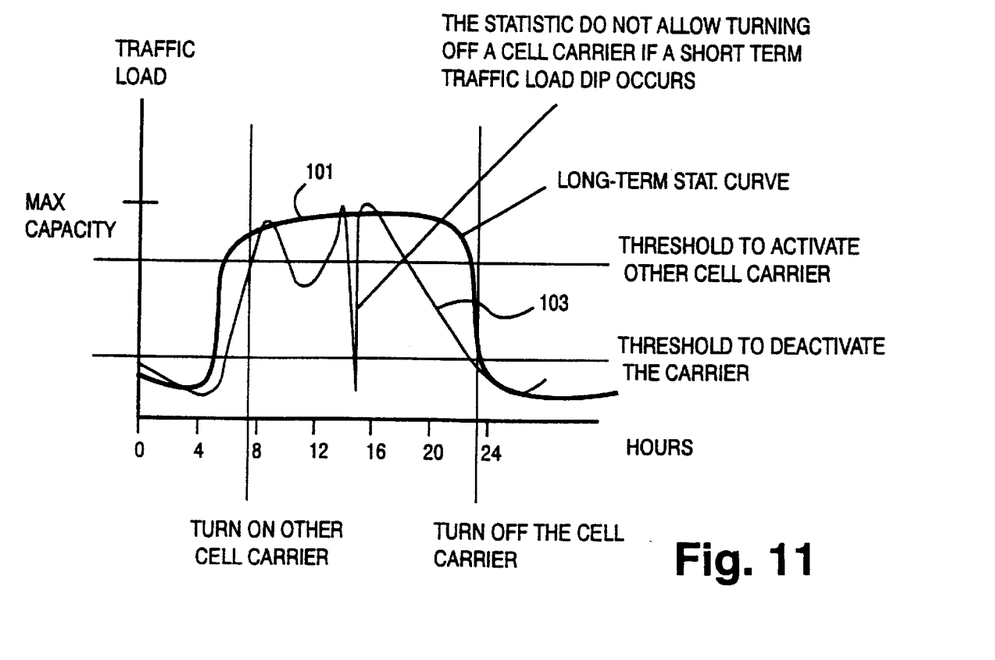
FIG. 11 is a time verses traffic load/capacity graph according to an embodiment of this invention, illustrating the use of a long-term statistical curve used in order to prevent short dips or peaks from turning off/on a carrier at an undesired time.

FIG. 11 illustrates a trend curve 101 formed using long term statistical data collected from a particular base station 7. For example, trend curve 101 may be an average of traffic load of the base station per time unit, at each point over the twenty-four hours of a day (e.g., a Tuesday) based upon measurements taken over multiple days (e.g., based upon combined data from multiple Tuesdays). The actual measured traffic load 103 for a carrier for a given day at issue is shown. According to this embodiment, the carrier will not be turned off unless both the trend curve 101 and the actual measured load 103 are below a particular threshold. Thus, the carrier is not turned off at approximately hour number 14-15 when the measured load 103 dips well below the threshold. This is because the trend curve 101 is above the threshold at that point in time. It is only when both curves 101 and 103 pass below the threshold that the carrier is turned off. Again, this minimizes the potential for unnecessary turnoffs of carriers. Thus, curve 101 may be formulated based upon statistical data taken over a long period of time so as to concentrate carrier shutoffs at times of day when they provide the greatest benefits (i.e., short traffic peaks and dips need not turn on or off cell carriers). Reducing the number of carrier turn-ons and turn-offs may also extend the life of certain components of the base station.

Figure 12:
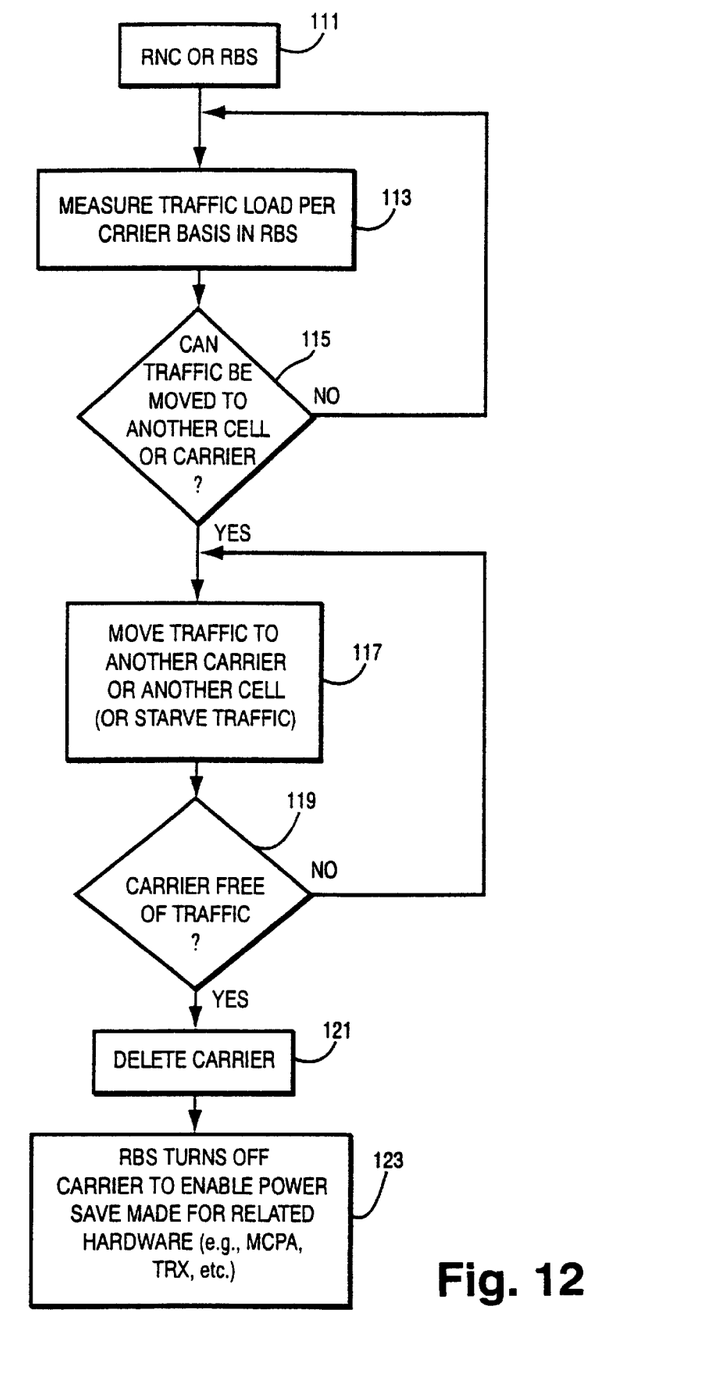
FIG. 12 is a flowchart illustrating certain steps taken according to an embodiment of this invention.

When one or more carriers is turned off at a base station, coordination between the base station carriers is required in order to remove remaining traffic from the carrier to be removed to another carrier(s). In other words, when a carrier is to be removed, traffic on it must be moved within the base station from that carrier to another carrier. FIG. 12 is a flowchart illustrating certain steps taken according to an exemplary embodiment of this invention in this regard. At a RNC or BS (see step 111), the traffic load per carrier for a base station is measured (see step 113). After it is determined that it is desired to turn off a carrier, it is determined at step 115 whether the traffic currently on the carrier to be removed can be moved to another carrier. If not, then the carrier is not removed. If the traffic on the carrier to be removed can be moved to another carrier (in the same or a different cell), then this is done at step 117. It is then determined at step 119 whether or not the carrier to be turned off is free of traffic. If not, remaining traffic is moved to another carrier. Typically, the RNC is in charge of moving traffic from one carrier to another carrier within the same or different base stations according to preferred embodiments of this invention. When the carrier to be removed is substantially free of traffic, an instruction is given at step 121 to remove the carrier. The base station turns off the carrier at step 123 in order to save power. Of course, the carrier is turned back on when the traffic load increases to a level above a predetermined threshold.

In alternative embodiments of this invention, step 117 may be replaced by "starving" out traffic from a carrier to be removed/turned off. In this regard, control logic in the RNC may begin to concentrate traffic into as few carriers as possible within a base station 7. By doing so, a number of carrier(s) become(s) free of traffic as no new incoming calls are permitted on them. These vacant carriers may then be shut down in order to save power. It may thus be said that the RNC starves out traffic from carriers targeted to be turned off. However, it is noted that semi-permanent connections must be moved via hand-over procedures.

In certain embodiments of this invention, after a particular carrier has been turned off by a base station, the base station may enter a maximum power saving mode by causing all unused traffic hardware associated with the turned-off carrier to enter a sleep mode (i.e., a mode that reduces consumed power). Alternatively, idle hardware relating only to the turned-off carrier may be switched off. It is noted with regard to power amplifiers (class A, B), it is often desired to turn such amplifiers off completely because they require high bias current in an idle state and thus may consume large amounts of power even when in an idle state.

Another aspect of this invention is the capability of turning off an MCPA(s) and/or hardware associated therewith in order to conserve power (see step 51 in FIG. 3 and step 77 in FIG. 4). In this regard, reference is made to FIGS. 13–15.

A drawback of MCPA technology is the poor efficiency rate with regard to power, which can in turn cause unwanted environmental stress. Thus, in order to conserve power, it is desired herein to turned off such amplifiers whenever it is possible to do so without sacrificing network performance. In a base station, several MCPAs may be connected in parallel in order to provide load sharing, increase the total output power of a carrier, and/or to provide redundancy for a carrier. Unfortunately, these benefits are accompanied by significant power consumption.

Figure 13:
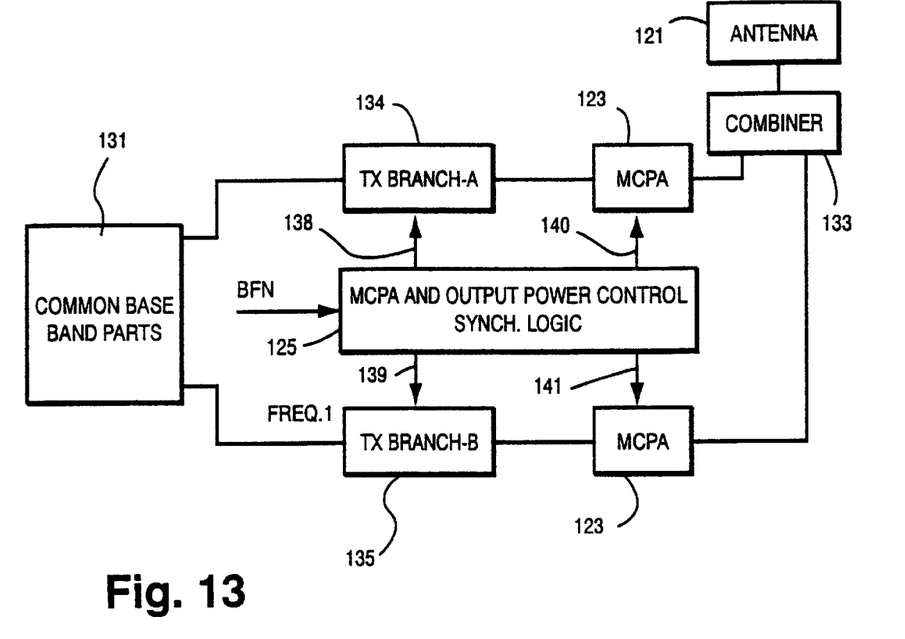
FIG. 13 is a block diagram illustrating certain components in the transmit chain of a base station according to an embodiment of this invention.
Figure 14:
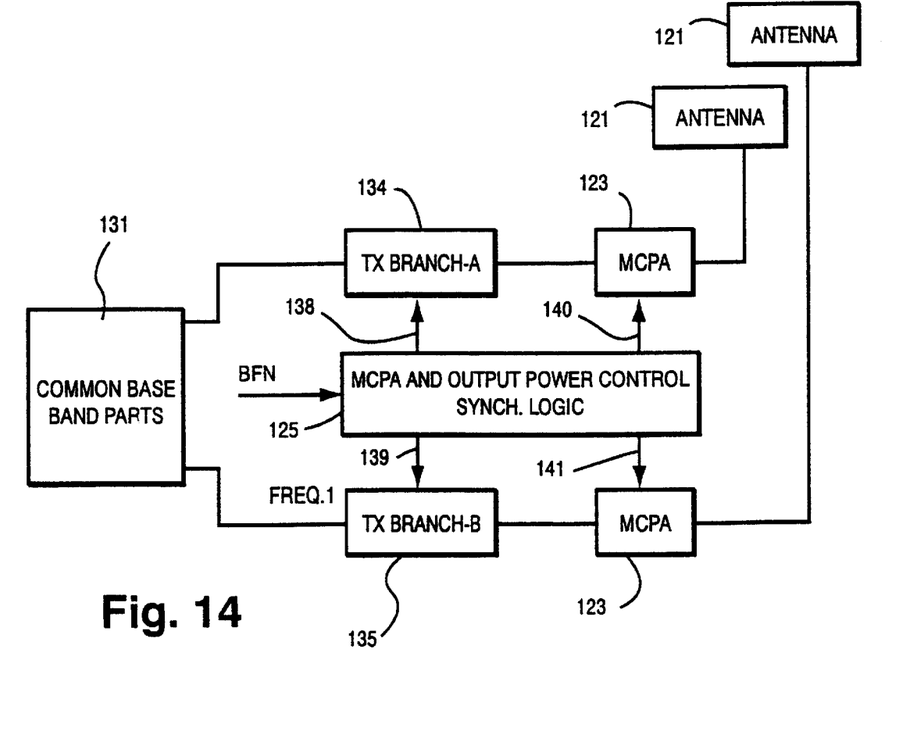
FIG. 14 is a block diagram illustrating certain components in the transmit chain of a base station according to another embodiment of this invention.

FIGS. 13–14 illustrate two different embodiments where MCPAs are provided in parallel in a base station. FIG. 13 illustrates a non-TX (non-transmit) diversity configuration where two parallel connected MCPAs amplify the same input signal toward one common antenna. Meanwhile, FIG. 14 illustrates a TX diversity configuration where two or more MCPAs amplify the same input signal toward separate transmit antennas (i.e., the FIG. 14 embodiment may be used to transmit one carrier into two different sectors). In each figure, the system includes at least one antenna 121, multiple MCPAs 123, MCPA and output power control synchronization logic 125, and common baseband parts 131 which feed the MCPA configuration. In the FIG. 13 embodiment, combiner 133 is provided in order to combine the signals from the multiple MCPAs toward the single antenna 121.

In the FIG. 13 embodiment, the same input signal from one baseband is fed into two separate transmission branches 134 and 135. These branches contain, for example, encoding and modulation of the baseband signals. Both TX branches feed there own MCPA 123. The amplified signals from the MCPAs 123 are then combined at 133 before the amplified output signal is fed to one common antenna 121. The MCPAs and TX branches can be controlled (e.g., on/off in accordance with this invention based upon traffic load and the like) via control interfaces 138, 139, 140, and 141.

Still referring to FIG. 13, the total output power of the carrier(s) will decrease by about 6 dB by shutting down one of the MCPAs. This 6 dB power loss includes a 3 dB loss due to turning off an MCPA in a parallel MCPA configuration, and another 3 dB loss due to power loss in the signal combiner circuit. As the total output power of the carrier is reduced by 6 dB, then power compensation may take place in order to keep the network configuration unchanged so as to not lose traffic. The total output power on the remaining MCPA therefore is preferably increased by 6 dB. The increase of the output power may be carried out in different ways (e.g., increase the amplification gain of the input signals in the remaining MCPA, and/or increase the power level of the input signal to the remaining MCPA).

In the FIG. 14 embodiment, the same input signal after being spread is fed into two separate branches 134 and 135. Both branches feed their own MCPA. The amplified output signal from each MCPA 123 is fed to a corresponding transmit/receive antenna 121 (i.e., the number of antennas corresponds to the number of MCPAs). Control logic is responsible for performing power adjustment synchronization required when turning off one of the MCPAs for the same carrier. The total output power of a carrier will be 3 dB less after shutting off one of the MCPAs. The output power of the remaining MCPA for the same carrier is thus raised by 3 dB if the network configuration (e.g., coverage) and ongoing traffic are to be kept unaffected. One drawback of turning off one MCPA is that transmit (TX) diversity for that carrier will be lost or reduced depending on the number of sectors the carrier is diversified over. However, if a loss of transmit (TX) diversity for a carrier is an acceptable sacrifice by compensating it by increasing the output power level of the remaining branch then much power can be saved during low traffic hours in accordance with such embodiments of this invention.

Accordingly, in order to not create any adverse impact on the network behavior and ongoing live traffic, the shutting off of an MCPA 123 to save power should be synchronized with power compensation (increase) on the other MCPA in both the FIG. 13 and FIG. 14 embodiments. A synchronization method in this regard may be based upon the base station's internal synchronization signals. An MCPA shutoff frame number can be defined and distributed in advance to all required parts in a base station. When the actual frame occurs, one MCPA per carrier can be turned off and the input power to or the amplification gain on the remaining MCPA (s) for that carrier can be increased by the required amount of power. This method of synchronization is for purposes of example only, and it is noted that any suitable type of synchronization may be used. In still further embodiments of this invention, if it is anticipated that synchronization between the shut-off of one MCPA and power increase for the other MCPA(s) cannot be carried out in a fully synchronized manner, then power regulation may be interrupted during this time in order to provide the necessary compensation.

Figure 15:
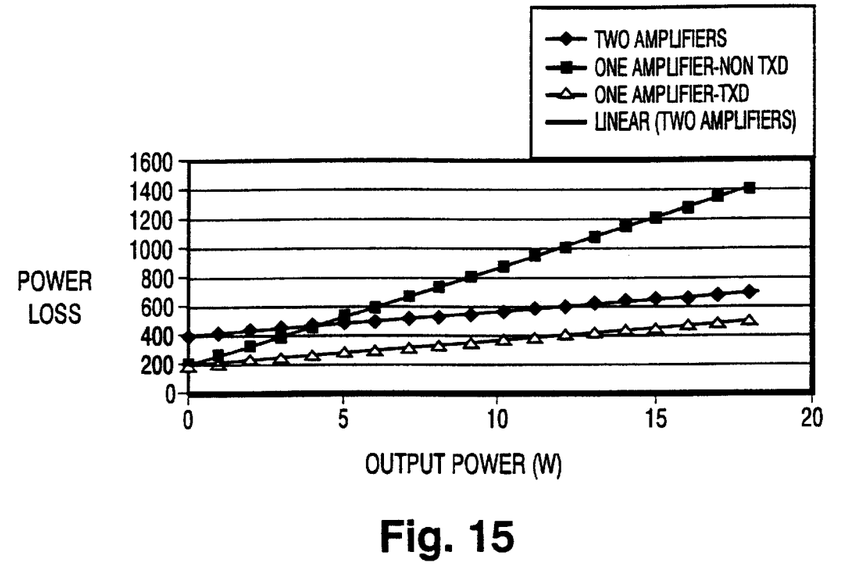
FIG. 15 is an output power verses power loss graph illustrating when it is desirable to switch off one or more amplifiers according to an embodiment of this invention.

The graph of FIG. 15 illustrates when it may desired to turn off an MCPA in accordance with either of the embodiments of FIGS. 13–14. Regarding FIG. 15, we consider only two MCPAs to be connected in parallel for amplifying the same input signal. However, no limitation is put on the number of MCPAs that may be used in any embodiment of this invention. As for FIG. 15, when it is determined that the total output power for a particular carrier has decreased below a predetermined threshold level, one MCPA half in a parallel MCPA configuration can be turned off. Optimum MCPA shutoff points for both TX diversity and non-TX diversity configurations are shown in FIG. 15. The following assumptions were made with regard to FIG. 15: maximum output power per MCPA is 18 W (36 W when parallel connected); MCPA class-AB efficiency rate 6%; one idle class-AB MCPA requires 200 W at zero traffic load; total of 6 dB additional power loss in a non-TX diversity configuration when one MCPA is turned off; and a total of 3 dB power loss in a TX diversity configuration due to the one MCPA being turned off. In the non-TX diversity case in FIG. 15, it can be seen that the optimum MCPA turn off point occurs when there is approximately a four (4) W total output power needed. In this particular example, this means a relationship of 1/36, i.e., when the output power needed for traffic is 1/9 of the total output power capability. However, in the TX-diversity case, the corresponding relevant figure for turnoff is approximately 18 W, as one power amplifier is capable of producing 18 W of total output power. Note that an assumption is made that 3 dB power compensation is required due to the shutoff of one TX-diversity branch due to the loss of TX diversity. Thus, the total output power does not exceed the 18 W after the 3 dB compensation. Accordingly, FIG. 15 illustrates when it would be appropriate to shut off one of the MCPAs in each of the FIG. 13 and FIG. 14 embodiments of this invention.

Figure 16:
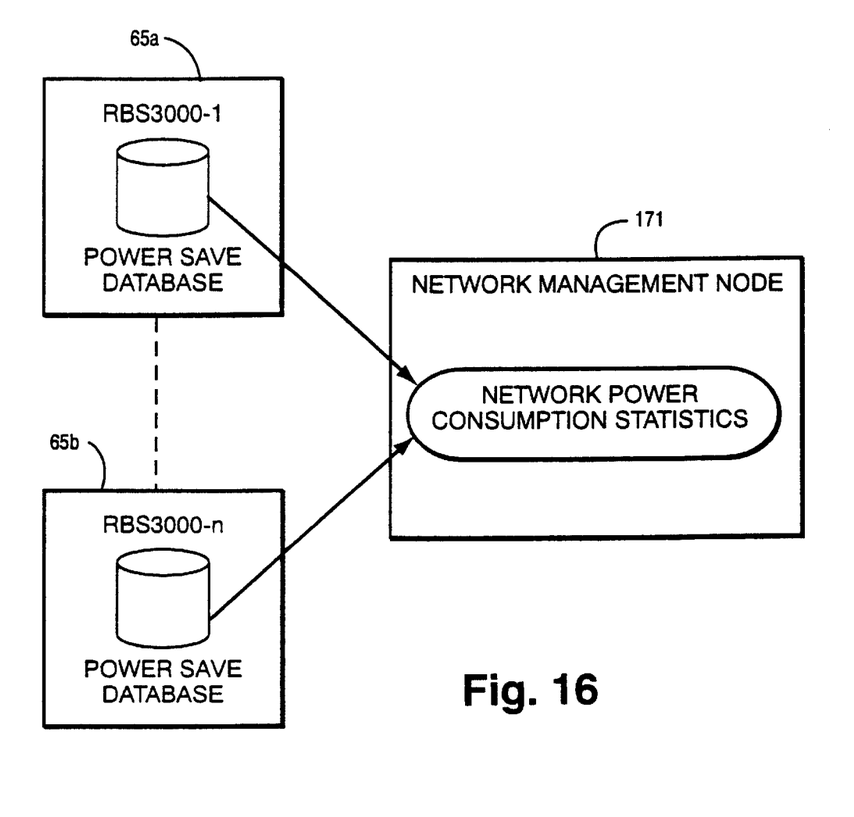
FIG. 16 is a function block diagram illustrating how a network management node can assemble power saving statistics of the network according to an embodiment of this invention.

FIG. 16 is a functional block diagram illustrating that a network management node 171 of the network of FIG. 1 can collect statistical information from databases 65a and 65b of respective base stations 7 and/or radio network controllers 5 so that the management node can build up a power save and power consumption statistical database on a network level. Economical advantages on the network level, as well as the node level, may thus be calculated from the statistical data received by management node 171. Reliable generation and print-outs of power consumption figures both on a network and node basis may be provided by management node 171. Moreover, reliable and instantaneous follow-ups on economical effects on a particular node as well as the network may be provided by node 171, as may the total savings implemented by certain embodiments of this invention. Power budget efficient rate calculations regard the entire network, and/or environmental stress effect measurements/calculations for the network or a portion thereof may also be performed easily in accordance with advantages resulting from this invention.

While the aforesaid embodiments have largely been discussed and illustrated in the context of base station (BS) nodes in a telecommunications network, it will be recognized by those skilled in the art that this invention may also be used in conjunction with other types of node in such networks. For example, this invention is also applicable to RNC, RNS, PSCN, and other type nodes which experience traffic fluctuations, where the traffic load can be readily measured, detected, or otherwise determined.

While the present invention has been described in terms of particular embodiments, those skilled in the art will recognize that the present invention is not limited to the specific example embodiments described and illustrated herein. Different formats, embodiments, and adaptations besides those shown and described as well as many modifications, variations, and equivalent arrangements may also be used to implement the invention.

What is claimed is:

1. A method of reducing power consumption by a base station in a cellular telecommunications network, the method comprising:
   providing a base station in the cellular telecommunications network;
   determining a traffic load of the base station;
   based at least in part upon the determined traffic load of the base station, determining whether or not to turn off or put to sleep at least a portion or part of a component or function of the base station in order to save power;
   turning off or putting to sleep a first multi-carrier power amplifier (MCPA) in order to save power; and
   increasing an output power of a second MCPA in parallel to the first MCPA so as to reduce adverse effects of turning off or putting to sleep the first MCPA.

2. The method of claim 1, further comprising the steps of:
   determining whether the determined traffic load of the base station is below a predetermined threshold; and
   based at least in part upon whether the determined traffic load of the base station is below the predetermined threshold, determining whether or not to turn off or put to sleep at least a portion or part of a component or function of the base station in order to save power.

3. The method of claim 1, wherein the component comprises at least one of a multi-carrier power amplifier (MCPA) and a circuit board.

4. The method of claim 1, wherein the component or function comprises transmission of one of more carriers by the base station to mobile stations in a cell of the base station.

5. The method of claim 4, further comprising:
   wherein the component or function comprises at least a first carrier transmitted by the base station;
   transferring traffic from the first carrier to at least one other carrier of the base station; and
   following said transferring step, turning off or otherwise disabling the first carrier in order to save power.

6. The method of claim 1, further comprising turning off or putting to sleep a component or function of the base station in order to save power.

7. The method of claim 6, wherein said turning off or putting to sleep step comprises at least one of: 1) switching off or putting to sleep one or more MCPAs, 2) turning off one or more carriers, 3) turning off one or more sectors with regard to a frequency, 4) turning off or putting to sleep one or more portions or parts of at least one circuit board, and 5) turning off or putting to sleep one or more circuit boards.

8. The method of claim 1, wherein said step of determining a traffic load of the base station is performed in one of the base station and a radio network controller node in communication with the base station.

9. The method of claim 1, further comprising:
   using a long-term statistical curve relating to historical traffic load data regarding the base station in said step of determining whether or not to turn off or put to sleep at least a portion of a component or function of the base station.

10. The method of claim 9, further comprising determining whether or not both of the long-term statistical curve and the determined traffic load of the base station are both on one side of a predetermined threshold in determining whether or not to turn off or put to sleep at least a portion of a component or function of the base station.

11. A method of determining whether or not to turn off or otherwise disable a carrier of a base station in a cellular telecommunications network, the method comprising:
   providing a base station in the cellular telecommunications network;
   determining a traffic load of the base station;
   based at least in part upon the determined traffic load of the base station, determining whether or not to turn off or otherwise disable a carrier of the base station, so that when the traffic load of the base station is below a predetermined threshold then said carrier is turned off or otherwise disabled; and
   providing a filter (67) which prevents said carrier from being turned off or otherwise disabled, even when said traffic load is below said predetermined threshold, during a certain time period(s) which has historically experienced high traffic load volume.

12. The method of claim 11, further comprising:

determining whether traffic on the carrier can be transferred to one or more other carriers of the base station;

transferring traffic from the carrier to at least one other carrier of the base station; and following said transferring step, turning off or otherwise disabling the first carrier.

13. A cellular telecommunications network comprising:

a base station for transmitting signals on at least one carrier to mobile stations in a cell of the base station;

a radio network controller in communication with said base station;

a measurement circuit for measuring output power or traffic load of the base station;

power save control logic for determining whether or not to turn off or put to sleep at least a portion of at least one function or component of the base station based at least in part upon an output from said measurement circuit;

means for turning off or putting to sleep a first multi-carrier power amplifier (MCPA) in order to save power; and means for increasing an output power of a second MCPA so as to reduce adverse effects of turning off of putting to sleep the first MCPA.

14. The network of claim 13, wherein said measurement circuit is located at one of the base station and the network controller.

15. The network of claim 13, wherein said power save control logic determines whether or not to turn off or put to sleep at least one function or component of the base station associated with one of a plurality of carriers used by said base station, based at least in part upon an output from said measurement circuit.

16. A base station for use in a cellular telecommunications network, the base station comprising:

at least one antenna for transmitting signals to mobile users in a cell of the base station;

a circuit for turning off or putting to sleep at least a portion or part of at least one component of the base station based at least in part upon traffic load of the base station when it is determined that the traffic load falls below a predetermined threshold; and filter means for preventing said component, or portion or part thereof, from being turned off or put to sleep even when the traffic load falls below said predetermined threshold, during certain time period(s) which has historically experienced high traffic load volume.

17. The base station of claim 16, further comprising a traffic load measurement circuit for measuring traffic load of the base station.

18. The base station of claim 16, wherein said circuit turns off at least one of a carrier of the base station and an amplifier of the base station based at least in part upon traffic load of the base station, in order to reduce power consumption by the base station.

19. A method of reducing power consumption by a node in a cellular telecommunications network, the method comprising:

providing the node in the cellular telecommunications network;

determining a traffic load of the node;

based at least in part upon the determined traffic load, determining whether or not to turn off or put to sleep at least a portion or part of a component or function of the node in order to save power;

turning off or putting to sleep a first multi-carrier power amplifier (MCPA) in order to save power; and increasing an output power of a second MCPA so as to reduce adverse effects of turning off or putting to sleep the first MCPA.

* * * * *